Patented Oct. 10, 1922.

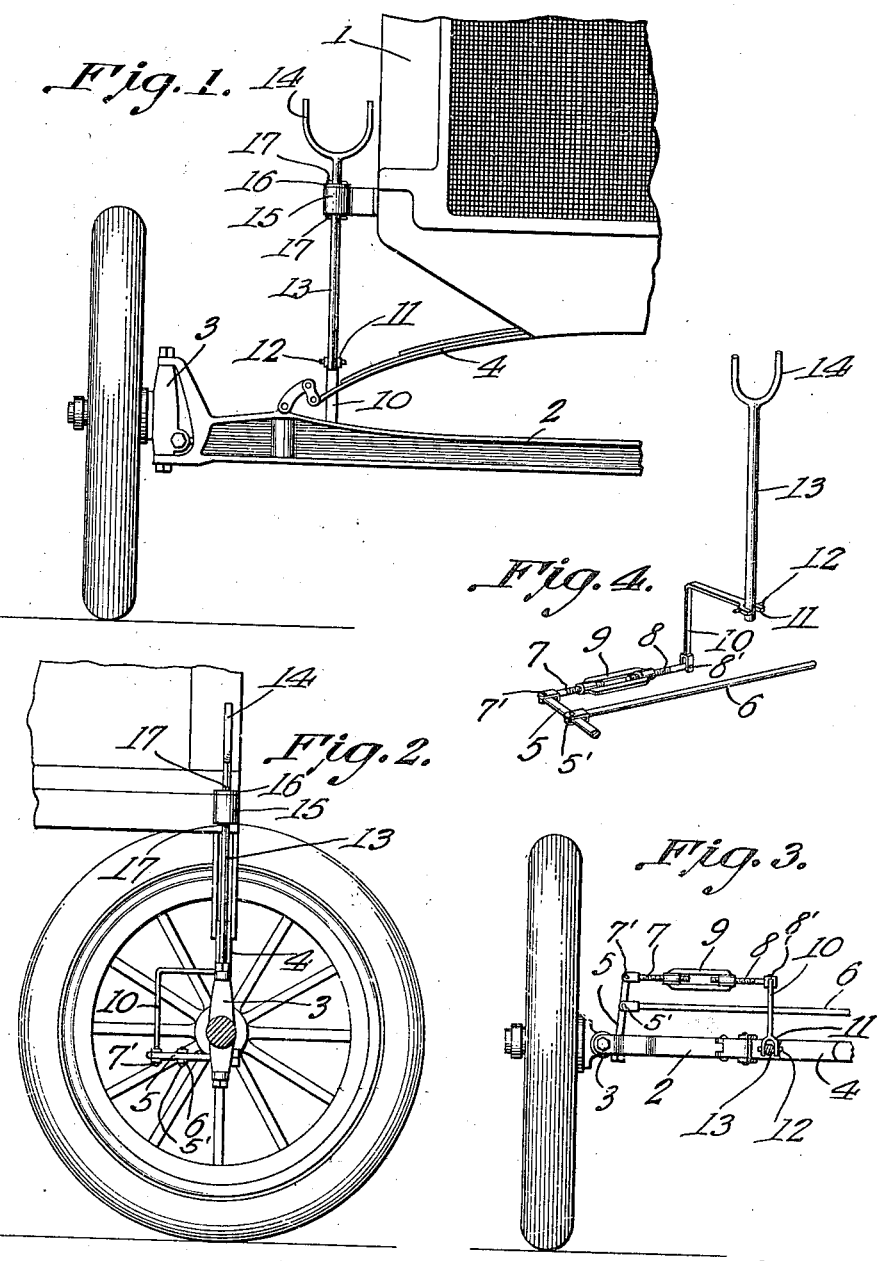

1,431,240

UNITED STATES PATENT OFFICE.

ROBERT L. LEATHERMAN AND SHERLOCK L. WALKER, OF MOUNT PLEASANT, PENNSYLVANIA.

DIRIGIBLE HEADLIGHT.

Application filed April 7, 1921. Serial No. 459,369.

*To all whom it may concern:*

Be it known that we, ROBERT L. LEATHERMAN, and SHERLOCK L. WALKER, citizens of the United States, residing at Mount Pleasant, in the county of Westmoreland and State of Pennsylvania, have invented certain new and useful Improvements in a Dirigible Headlight, of which the following is a specification.

This invention has relation to certain new and useful improvements in dirigible headlights for automobiles, and the primary object of this invention is to provide a simply constructed, inexpensive, positively operating headlight turning mechanism, arranged to be attached to an ordinarily constructed automobile.

With these and other ends in view which will readily appear as the nature of the invention is better understood, the same consists in the improved construction and novel arrangement and combination of parts which will be hereinafter fully described and particularly pointed out in the claim.

In the accompanying drawings has been illustrated a simple and preferred form of the invention, it being, however understood that no limitation is necessarily made to the precise structural details therein exhibited, but that changes, alterations and modifications within the scope of the claim may be resorted to when desired.

In the drawing:

Figure 1 is a front view of our invention attached to an automobile.

Figure 2 is a side view of Figure 1.

Figure 3 is a plan view, with the lamp shaft in section.

Figure 4 is a perspective view of our invention.

In carrying out the aim of our invention we employ a vertically held lamp shaft 13, the upper end 14 of which is forked to receive the usual lamp. This shaft is held and supported by means of the roller bearing 15 secured to a suitable part of the automobile body 1, and has swiveled to its lower end the fork 11 of the operating arm 10, by means of the pin 12.

Connecting the usual rod 6 to one of the axle kunckles 3, is the stub bar 5, which projects beyond the rod 6 as shown in Figure 3, and swiveled to the end of this stub bar 5 is the forked end of the turnbuckle bar 7 held by means of the pin 7'. The other member 8 of the turnbuckle 9 being swiveled to the forked end 8' of the operating arm 10. By means of the turnbuckle 9 the position of the lamp can be nicely adjusted.

In order to properly hold the shaft 13, we provide the shaft with the pin 17, which works on the top and bottom 16, of the bearing 15, in the manner shown in Figure 2.

From the foregoing description, taken in connection with the accompanying drawings, the operation and advantages of our invention will be readily understood.

Having thus described our invention, what we claim, and deesire to secure by Letters Patent, is:

A dirigible headlight for automobiles comprising the combination with a kunckle operating bar of the steering mechanism of a motor vehicle, of a vertically disposed lamp-shaft, means for mounting said shaft on the vehicle for rotation about a vertical axis, and means providing an adjustable flexible actuating connection between the said lamp-shaft and the said knuckle operating bar, said means including a right angle member and a turn-buckle having adjacent ends pivotally connected together for movement about a horizontal axis and their oppositely disposed ends connected respectively to the said bar and the said shaft for swinging movement in a plane parallel to the plane of the said members.

In testimony whereof, we affix our signatures.

ROBERT L. LEATHERMAN.
SHERLOCK L. WALKER.